(12) United States Patent
Sangodkar et al.

(10) Patent No.: US 11,762,911 B2
(45) Date of Patent: Sep. 19, 2023

(54) UTILIZING SEARCH CAPABILITIES FOR CONFIGURING INPUT PARAMETERS OF A WORKFLOW ENGINE

(71) Applicant: VMWARE, INC., Palo Alto, CA (US)

(72) Inventors: Amit Sangodkar, Pune (IN); Anant Karve, Pune (IN); Rahul Kumar, Pune (IN)

(73) Assignee: VMWARE, INC., Palo Alto, CA (US)

( * ) Notice: Subject to any disclaimer, the term of this patent is extended or adjusted under 35 U.S.C. 154(b) by 195 days.

(21) Appl. No.: 16/143,490

(22) Filed: Sep. 27, 2018

(65) Prior Publication Data

US 2020/0034491 A1 Jan. 30, 2020

(30) Foreign Application Priority Data

Jul. 25, 2018 (IN) .............................. 201841027954

(51) Int. Cl.
*G06F 16/9032* (2019.01)
*G06F 16/182* (2019.01)
(Continued)

(52) U.S. Cl.
CPC ...... *G06F 16/90328* (2019.01); *G06F 9/3005* (2013.01); *G06F 9/4488* (2018.02);
(Continued)

(58) Field of Classification Search
CPC .. G06Q 10/0633; G06Q 10/103; G06Q 10/06; G06F 16/90328; G06F 16/182;
(Continued)

(56) References Cited

U.S. PATENT DOCUMENTS 7,581,011 B2   8/2009  Teng
9,026,949 B1 * 5/2015  Carmi .................... G06Q 10/06
                                                      715/854

(Continued)

OTHER PUBLICATIONS

Badii, A., et al. "Workflow data exchange semantics, object discovery & integration architecture for cross media production & distribution." First International Conference on Automated Production of Cross Media Content for Multi-Channel Distribution (AXMEDIS'05). IEEE, 2005. (Year: 2005).*

(Continued)

*Primary Examiner* — Jesse P Frumkin (57) ABSTRACT

Executing workflows can include receiving, via an interface associated with execution of a workflow, an entry corresponding to a particular workflow object from among a plurality of workflow objects of a datacenter, communicating the entry to a third-party system, receiving, from the third-party system, search results corresponding to the entry, wherein the search results include indications of a subset of the plurality of workflow objects of the datacenter that each have a threshold correlation with the entry, displaying, via the interface, a plurality of items respectively corresponding to the subset of the plurality of workflow objects of the search results, receiving a selection, via the interface, of an item of the plurality of items, and designating a workflow object of the subset of the plurality of workflow objects of the search results that corresponds to the selected item as an input parameter of the workflow responsive to the selection.

20 Claims, 4 Drawing Sheets

(51) Int. Cl.
  *G06F 16/248*  (2019.01)
  *G06F 9/30*    (2018.01)
  *G06F 9/448*   (2018.01)
  *G06F 9/54*    (2006.01)

(52) U.S. Cl.
  CPC ............ *G06F 9/541* (2013.01); *G06F 16/182* (2019.01); *G06F 16/248* (2019.01)

(58) Field of Classification Search
  CPC .... G06F 16/248; G06F 9/3005; G06F 9/4488; G06F 9/541
  See application file for complete search history.

(56) References Cited

U.S. PATENT DOCUMENTS

| | | | |
|---|---|---|---|
| 9,696,971 B1 * | 7/2017 | Wierda | G06F 8/41 |
| 10,984,897 B2 * | 4/2021 | Connely, IV | G16H 20/00 |
| 2004/0249907 A1 * | 12/2004 | Brubacher | H04L 63/02 |
| | | | 709/220 |
| 2006/0074731 A1 | 4/2006 | Green et al. | |
| 2007/0162324 A1 * | 7/2007 | Suzuki | G06Q 10/06 |
| | | | 705/7.26 |
| 2007/0174101 A1 | 7/2007 | Li et al. | |
| 2008/0201715 A1 | 8/2008 | Breiter et al. | |
| 2010/0121859 A1 | 5/2010 | Maeda et al. | |
| 2010/0131872 A1 * | 5/2010 | Bagley | G06Q 10/06 |
| | | | 715/764 |
| 2013/0142193 A1 * | 6/2013 | Yuen | H04M 3/567 |
| | | | 370/352 |
| 2014/0297662 A1 * | 10/2014 | Wu | G06F 16/245 |
| | | | 707/754 |
| 2015/0079960 A1 * | 3/2015 | Silin | H04L 63/101 |
| | | | 455/418 |
| 2016/0358102 A1 * | 12/2016 | Bowers | G06N 20/00 |
| 2017/0024436 A1 * | 1/2017 | Look | G06F 16/242 |
| 2017/0315789 A1 * | 11/2017 | Lam | G06Q 10/067 |
| 2018/0121026 A1 * | 5/2018 | Nadig | G06F 40/103 |
| 2018/0121611 A1 * | 5/2018 | Connely, IV | G16H 40/67 |
| 2020/0065725 A1 * | 2/2020 | Samanthapudi | G06Q 30/0621 |

OTHER PUBLICATIONS

George A. Miller (1995). WordNet: A Lexical Database for English. Communications of the ACM vol. 38, No. 11: 39-41. (Year: 1995).*

* cited by examiner

UTILIZING SEARCH CAPABILITIES FOR CONFIGURING INPUT PARAMETERS OF A WORKFLOW ENGINE

RELATED APPLICATIONS

Benefit is claimed under 35 U.S.C. 119(a)-(d) to Foreign Application Serial No. 201841027954 filed in India entitled "UTILIZING SEARCH CAPABILITIES FOR CONFIGURING INPUT PARAMETERS OF A WORKFLOW ENGINE", on Jul. 25, 2018, by VMware, Inc., which is herein incorporated in its entirety by reference for all purposes.

BACKGROUND

Workflow engines can be used to create a flow of work items in a specified order, commonly referred to as a workflow. A work item refers to a task defined to perform a desired operation. The order of flow of work items can be sequential and/or parallel. Workflow engines can orchestrate the execution of the work items according to the flow as defined.

DETAILED DESCRIPTION

A workflow, as referred to herein, is a set of one or more work items executed in a specified order. Stated differently, a workflow refers to a flow of work items in a specified order. Workflows combine actions, decisions, and results that, when performed in a particular order, complete a specific task or a specific process in a virtualized environment. Virtualization separates physical infrastructures from a compute environment to create various dedicated resources. Workflows perform tasks such as provisioning virtual computing instances (VCIs), backing up, performing regular maintenance, sending emails, performing operations (e.g., Secure Shell (SSH) operations), managing a physical infrastructure, and other general utility operations. Workflows accept inputs according to their function. In some embodiments, workflows can run according to defined schedules. In some embodiments, workflows run if certain anticipated events occur. A work item, as referred to herein, is a task defined to perform a desired operation. In some embodiments, a workflow can include a schema, attributes, and parameters. The workflow schema can define the workflow elements (e.g., work items) and the logical connections between them. The workflow attributes are the data that a workflow processes. The workflow parameters are variables that workflows use to transfer data. One type of parameter, an input parameter, refers to data that the workflow processes when it starts. For example, if a workflow resets a virtual machine, the workflow may receive, as an input parameter, the name of the virtual machine to reset. An input parameter can include properties such as name, type, and description, for instance.

An engine can refer to an application and/or utility executed to perform a task. Workflow engines can be applications and/or utilities used to create workflows. Workflow engines can orchestrate the execution of the work items according to the flow as defined. Depending on the requirements, workflows can be sequential in some cases, and workflows can be parallel in some cases. For example, if a work item B has a dependency on a work item A, then the workflow will execute work item A before executing work item B. Independent work items can be executed ("run") in parallel. Workflows can support advanced operations such as conditionals, looping, custom scripting, branching, and/or nesting of workflows within other workflows, among other operations.

Input parameters can be specified during runtime via an interface. In some embodiments, input parameters can be specified by a user. Some workflows can include input parameters that reference objects of a system (e.g., a datacenter). Objects can include, for example, switches, logical switches, routers, logical routers, transport zones, gateways, etc. For example, in a workflow entitled "Connect logical switch to router," input parameters can include a particular logical switch and a particular virtual router (e.g., identifications of the logical switch and the virtual router). In some embodiments, a prompt may be issued by a workflow engine interface to enter a desired input parameter. Such an entry may be received in a field configured to accept alphanumeric inputs, for instance. Typically, it suffices to receive a respective identifier as the input parameter representing each of these elements. The identifier can be an alphanumeric code uniquely associated with the object, though embodiments herein are not so limited. For example, an identifier for a particular logical switch can be "logicalswitch-1," and an identifier for a particular virtual router can be "router-0."

However, from the perspective of a user, object identifiers may be long, unobvious, and/or difficult to remember. In previous approaches, an inventory may be provided, which is intended to include a collection of all the objects in the system. When executing a workflow according to previous approaches, a user can obtain input parameters by accessing such an inventory, performing an inventory lookup, and selecting objects from the inventory. However, these approaches have notable shortcomings. For instance, consulting the inventory may require the user to initiate a separate user interface causing annoyance and/or distraction. In some cases, the inventory may contain a large number of objects such that an entirety of a display is needed for its visualization. With large numbers of objects, finding and selecting a desired object may be time consuming. In some cases, inventories may be presented in complex tree structures with many levels whose mere navigation calls for skill and/or training. Further, when new objects are introduced in the system, corresponding entries of objects in the inventory need to be added. Previous approaches may be inadequate, especially in cases where objects have not yet been added to the system inventory.

Embodiments of the present disclosure, in contrast, can leverage the search capabilities of a third party (e.g., external) system to provide input parameters to workflows. In some embodiments, for instance, a user can begin to enter, as an input parameter, a name, type, or other property of a desired object into a user interface. The entered characters can be communicated to a third-party system which can use its searching capabilities to return one or more indications of matching objects (e.g., identifiers). The identifiers of the matching object or objects can be displayed on the same user interface. From those displayed matching identifiers, the user can select an identifier associated with the desired object and the object can be provided as an input parameter to the workflow.

By removing the need for multiple interfaces and complex inventories, embodiments of the present disclosure improve interfaces associated with workflow execution. By avoiding the requirement of entering objects into an inventory, embodiments of the present disclosure improve workflows by ensuring that objects available as workflow input parameters are up-to-date.

The improvement of workflows and workflow creation improves the operations of computing devices and computing systems. Whereas, in previous approaches, inventories may not be representative of the objects in the system, embodiments herein can obviate the need to maintain an up-to-date inventory. In previous approaches, an inventory associated with a system may be constructed in the workflow engine so that it can be utilized by a workflow. As a result, the inventory may lag behind in terms of the objects supported by a third party system. With incorrect and/or missing objects, a desired workflow may not be feasible. Embodiments of the present disclosure can allow the streamlined creation and/or modification of workflows without the use of the inventories of previous approaches.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIG. 2. A group or plurality of similar elements or components may generally be referred to herein with a single element number. For example, a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure and should not be taken in a limiting sense.

Figure 1:
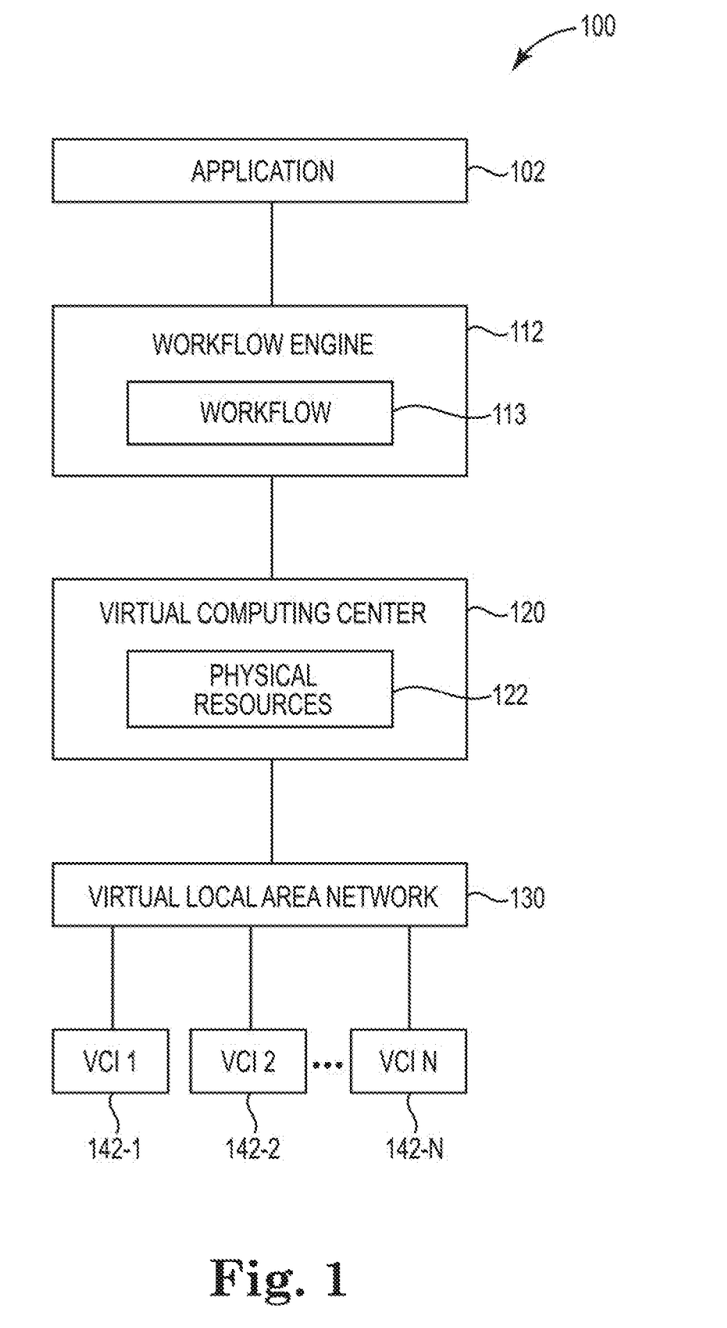
FIG. 1 is a block diagram illustrating an infrastructure associated with utilizing search capabilities for configuring input parameters of a workflow engine according to the present disclosure.

FIG. 1 is a block diagram illustrating an infrastructure 100 associated with utilizing search capabilities for configuring input parameters of a workflow engine according to the present disclosure. The infrastructure 100 can include an application 102, which can be implemented as a layer of executable instructions that handle workflow creation (e.g., execution) requests. Physically, the application 102 can be implemented in a computing device coupled to a virtual computing center 120 or can be included in physical resources 122 of a virtual computing center 120, for example, as instructions executing on a processor thereof. A workflow 113 could commission, provision or decommission one or more VCIs 142-1, 142-2, . . . 142-N, a virtual local area network (VLAN) 130, or other virtual or physical arrangement of the physical resources 122 available from the virtual computing center 120, as a service fulfillment process, for example. In some embodiments, the application 102 and the workflow engine 112 are implemented on the same server, which could be a physical computing resource, or a virtual server implemented on physical computing resources. In some embodiments, the application 102 and the workflow engine 112 are implemented in various physical computing resources.

The application 102 can generate a user interface for workflow inputs. This user interface can be in the form of HTML (hypertext markup language), and is discussed in further detail below. The application 102 can accept user inputs, validate the user inputs, and forward the request to the workflow 113 resident in the workflow engine 112. The workflow engine 112 can be a virtual or physical computing device, e.g., a virtual server, a physical server, etc. The workflow 113 can execute within the workflow engine 112. The workflow 113 can allocate physical resources 122 in the virtual computing center 120. This execution can allocate one or more VCIs 142-1, 142-2, . . . 142-N and virtual local area network 130, in some embodiments.

The term VCI covers a range of computing functionality. VCIs may include non-virtualized physical hosts, virtual machines (VMs), and/or containers. A virtual machine (VM) refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a virtual computing center. In such a system, information can be propagated from an end user to at least one of the VCIs in the system, between VCIs in the system, and/or between at least one of the VCIs in the system and a management server. In some embodiments, the management server can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

Figure 2:
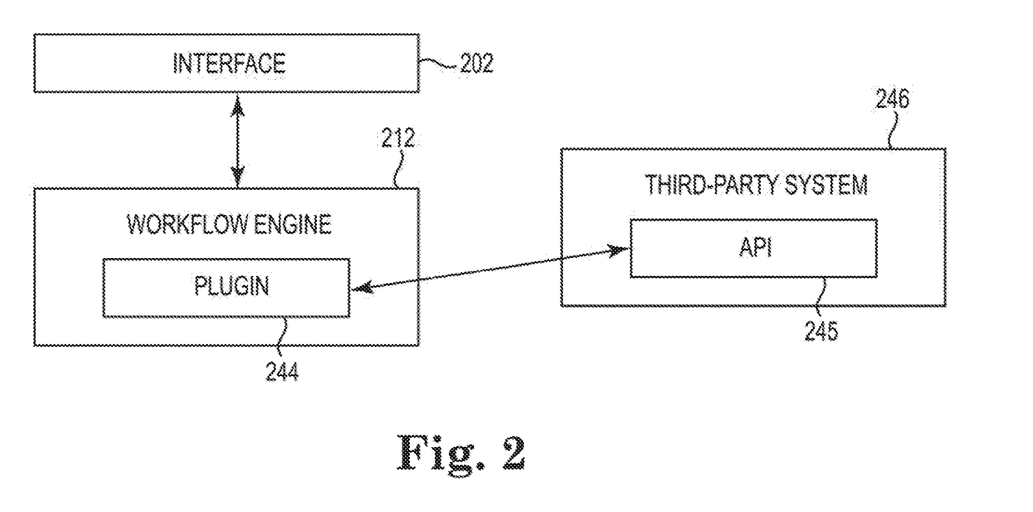
FIG. 2 is a block diagram illustrating a portion of a system associated with utilizing search capabilities for configuring input parameters of a workflow engine according to the present disclosure.

FIG. 2 is a block diagram illustrating a portion of a system associated with utilizing search capabilities for configuring input parameters of a workflow engine according to the present disclosure. An interface 202 can be provided, which, in some embodiments, may be analogous to the application 102, previously described in connection with FIG. 1. For instance, in some embodiments the interface 202 can be in the form of hypertext markup language (HTML). The interface 202 can receive inputs (e.g., user inputs). The interface 202 can validate the inputs and forward the inputs (e.g., as a request) to a workflow engine 212. In some embodiments, the interface 202 can include, for example, a keyboard, a mouse, a joystick, a display, a touch screen display, a microphone, a speaker, one or more biometric input devices, and/or other input/output mechanisms.

In some embodiments, a workflow engine 212 can be analogous to the workflow engine 112, previously described in connection with FIG. 1, though embodiments herein are not so limited. The workflow engine 202 can be used to execute workflow processes and/or automate bulk operations. The workflow engine 202 can orchestrate the execution of work items according to a defined flow. The workflow engine 202 can be accessed though a network or client interface, as previously discussed.

A third-party plugin 244 (sometimes referred to herein simply as "plugin 244") can be associated with the workflow engine 212. The workflow engine 212 can implement the plugin 244. The workflow engine 212 can provide services that the plugin 244 can utilize. The plugin 244 can be registered with the workflow engine 212. The plugin 244 can allow interaction between the workflow engine 212 and the third-party system 246.

The third-party system 246 can provide searching functionality. Embodiments herein do not limit the third-party system 246 to providing only searching functionality, however. For instance, in some embodiments, the third-party system 246 can be a network virtualization and security platform. The third-party system 246 can maintain a library of network constructs (e.g., ports, switches, routers, firewalls, etc.) in virtual space.

The API 245 can enable communication between the plugin 244 and the third-party system 246. The plugin 244 can invoke functionalities of the third-party system 246 via the API 245. In some embodiments, the API can be a representational state transfer API.

Figure 3:
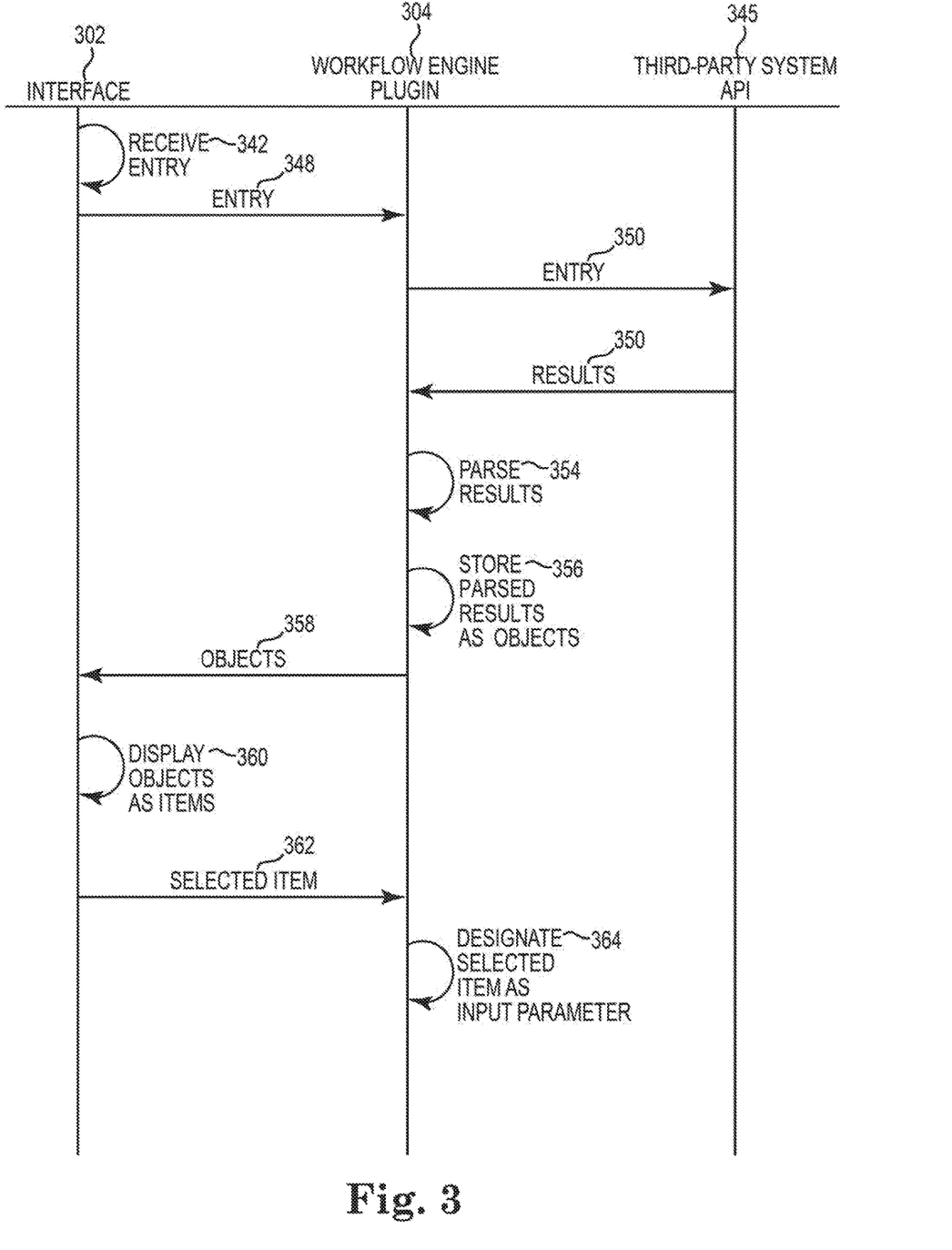
FIG. 3 illustrates a flow chart associated with utilizing search capabilities for configuring input parameters of a workflow engine according to the present disclosure.

FIG. 3 illustrates a flow chart associated with utilizing search capabilities for configuring input parameters of a workflow engine according to the present disclosure. The flow chart illustrated in FIG. 3 illustrates an example flow of communication between the system constituents illustrated in FIG. 2 and previously described herein; for instance, the interface 302, the workflow engine plugin 344, and the third-party system API can be respectively analogous to the interface 202, the plugin 244, and the API 245.

As previously discussed, the interface 302 can receive inputs. For instance, at 347, the interface can receive inputs that embody a portion of an entry corresponding to a particular workflow objects from among a plurality of workflow objects of a datacenter. Where the term "entry" is used herein, it is to be understood that such usage may refer to entered characters embodying either a completed entry or a portion of an entry. For example, an "entry" can refer to the term "MyLogicalSwitch" and/or "My . . . ." In some embodiments, for instance, a user can begin to enter, as an input parameter, a name, type, or other property of a desired object into the interface 302. In some embodiments, the entry can be a name of a desired workflow object. In some embodiments, the entry can be a type of a desired workflow object. In some embodiments, the entry can be an identifier (e.g., objectidentifier) of a desired workflow object.

At 348, the entry can be communicated from the interface 302 to the plugin 344. At 350, the entry can be communicated from the plugin 344 to the API 345. In some embodiments, a portion of the entry can be communicated to the API before the entry is completed. For instance, a portion of a word or term can be entered, and that portion can be communicated before the word is fully entered.

Based on the entry, the API 345 can perform a search and, at 352, return results of the search to the plugin 344. The search can be a distributed full-text search of the datacenter, for instance. For example, the search can be performed using Elasticsearch®. Elasticsearch is a search engine that provides a distributed, multitenant-capable full-text search engine with an HTTP web interface and schema-free JavaScript Object Notation (JSON) documents. Elasticsearch can provide scalable search, has near real-time search and is distributed, meaning that indices can be divided into shards, and each shard can have zero or more replicas. In some embodiments, a single result can be found and/or returned. In some embodiments, a plurality of results can be found and/or returned. The search can yield indications of one or more workflow objects of the datacenter that correspond to the entry. Each of the results 352 can each have a threshold correlation with the entry. For instance, each of the results 352 can include text that matches, or matches a portion of, the entry. In an example, the results are returned to the plugin 344 as a list of LinkedTreeMap<String, String>, where each result is LinkedTreeMap<String, String>.

The plugin 344 can parse the results at 354 and store the parsed results as objects 356. In some embodiments, the results can be saved locally (e.g., by the plugin 344) in respective plugin model class objects. The objects can have properties that are common across the results.

At 358, indications of the objects can be communicated to the interface 302. The interface 302 can display the indicated objects as items at 360. In some embodiments, the items can be displayed in a display element using the interface 302, which is discussed in more detail below in connection with FIG. 4. In some embodiments, there may be only one object returned and displayed.

At 362, the interface can receive a selection of an item and an indication of the selected item can be communicated to the plugin 362. Responsive to the selection, the plugin can, at 364, designate the selected item (e.g., the workflow object corresponding to the selected item) as the input parameter of the workflow.

In cases where only one object is returned, some embodiments can include designating the corresponding item as the input parameter responsive to that item being selected via the interface 302 (e.g., by a user). Some embodiments can include designating the object as the input parameter without a selection via the interface 302. For instance, the object can be designated responsive to the single search result having a threshold correlation with the entry. For instance, the single search result can include text that matches, or matches a portion of, the entry.

The workflow, including the designated input parameter, can be executed. Workflows can be executed to perform tasks such as provisioning virtual machines, backing up, performing regular maintenance, sending emails, performing operations (e.g., SSH operations), managing a physical infrastructure, and other general utility operations.

Figure 4:
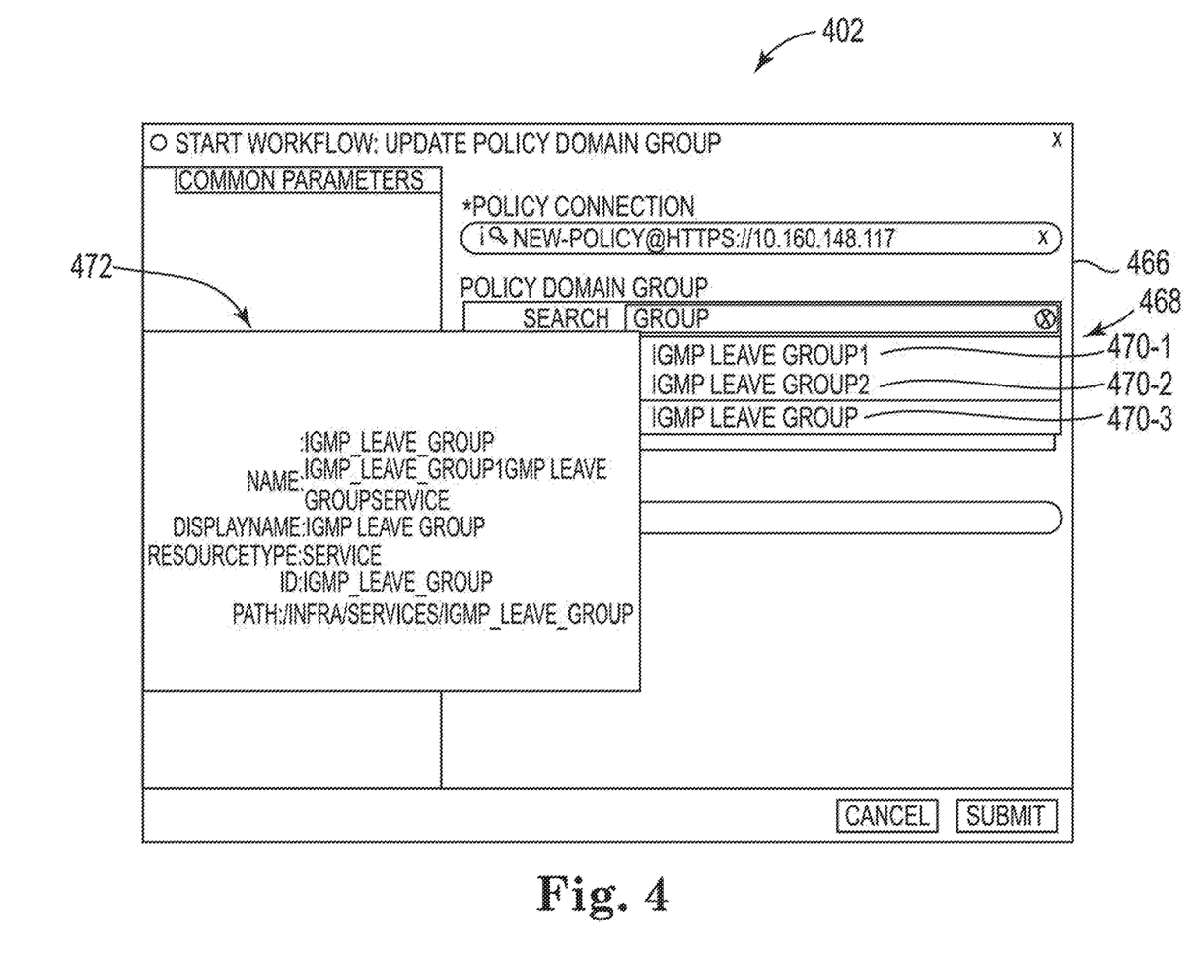
FIG. 4 illustrates an example interface for utilizing search capabilities for configuring input parameters of a workflow engine according to the present disclosure.

FIG. 4 illustrates an example interface 402 for utilizing search capabilities for configuring input parameters of a workflow engine according to the present disclosure. The interface 402 can be displayed by a display device. In the example illustrated in FIG. 4, a workflow associated with updating a policy domain group is being executed. An input parameter can be added and/or modified using a display element of the interface 402. For instance, such a display element, a field 466, is provided to receive an entry corresponding to a workflow object of a datacenter. The field 466 can be configured to receive alphanumeric inputs (e.g., made using a keyboard). In some embodiments, the field 466 can have an input type as a default searchable item.

The entry into the field 466 can correspond to a name of a desired workflow object. The entry into the field 466 can correspond to a type of a desired workflow object. The entry into the field 466 can correspond to a identifier of a desired workflow object. In the example illustrated in FIG. 4, the text "group" has been entered. As previously discussed, a search of the datacenter can be performed by embodiments herein based on the entry, and a portion of a word or term can be entered, and that portion can be communicated and searched before the word is fully entered.

As shown in FIG. 4, a results display element 468 can be displayed via the interface 402. The results display element 468 can include one or more items corresponding to results of the search. The results display element 468 can be displayed adjacent to (e.g., below) the field 466, as illustrated in the example interface 402, though embodiments herein are not so limited. The search results can include workflow objects of the datacenter that each have a threshold correlation with the entry into the field 466. The example illustrated in FIG. 4 includes three such search results: a first search result 470-1 ("IGMP Leave Group1"), a second search result 470-2 ("IGMP Leave Group2"), and a third search result 470-3 (IGMP Leave Group").

The search results of the results display element 468 can be individually selectable items. One of the search results can be designated as an input parameter of the workflow responsive to a first type of interaction with that search result item. The first type of interaction can be a selection interaction. A selection can be performed in different manners depending on the type of display device providing the interface 402 and/or other hardware devices used to interact with the interface 402. In some embodiments, a selection may involve a mouse click. In some embodiments, a selection may involve a momentary contact with a touch screen display (e.g., a brief touch). In an example, the third search result 470-3 can be designated as the input parameter responsive to the selection, via a mouse click, of the third search result 470-3. It is noted that in some embodiments, a search result may not be designated as the input parameter until the selection of another display element indicating completion (e.g., "submit").

The search results can be interacted with via a second type of interaction. The second type of interaction can cause information associated with a particular search result to be displayed via a details display element 472. The second type of interaction can be a different interaction than the first type of interaction. The second type of interaction can be performed in different manners depending on the type of display device providing the interface 402 and/or other hardware devices used to interact with the interface 402. In some embodiments, the second type of interaction may involve a hovering over a search result with a cursor representing an input device (e.g., a mouse). Hovering, as used herein, refers to maintaining a position of a cursor within a particular area of the interface 402 for a particular period of time. In some embodiments, the second type of interaction may involve a prolonged contact with a touch screen display (e.g., a long touch).

The details display element 472 can be displayed adjacent to the results display element 468 as shown in the example illustrated in FIG. 4, though embodiments of the present disclosure are not so limited. The details display element 472 can include information describing the result with which the second interaction was made. Stated differently, the details display element 472 can include information describing a workflow object corresponding to the result. For instance, the details display element 472 can include a name of the workflow object, a displayed name of the workflow object, a type of the workflow object, an identifier of the workflow object, and/or a path associated with the workflow object, among other details. The first type of interaction can be performed while the details display element 472 is displayed. The first type of interaction can be performed while the details display element 472 is not displayed.

Embodiments of the present disclosure can be implemented in a computing device and/or computing system. An example system can include a database, a subsystem, and/or a number of engines in communication with the database via a communication link. The system can include program instructions and/or hardware of a machine. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the engine(s) can include a combination of hardware and program instructions that can be configured to receive, via an interface associated with creation of a workflow, a portion of an entry corresponding to a particular workflow object from among a plurality of workflow objects of a datacenter, communicate the portion of the entry to a third-party system, receive, from the third-party system, search results corresponding to the portion of the entry, wherein the search results include indications of a subset of the plurality of workflow objects of the datacenter that each have a threshold correlation with the portion of the entry, display, via the interface, a plurality of items respectively corresponding to the subset of the plurality of workflow objects of the search results, receive a selection, via the interface, of an item of the plurality of items, and designate a workflow object of the subset of the plurality of workflow objects of the search results that corresponds to the selected item as an input parameter of the workflow responsive to the selection.

Computing devices and/or systems according to embodiments herein can utilize software, hardware, firmware, and/or logic to perform a number of functions. For instance, embodiments of the present disclosure can include a combination of hardware and program instructions configured to perform a number of functions (e.g., actions). The hardware, for example, can include a number of processing resources and a number of memory resources, such as a machine-readable medium (MRM) or other memory resources. The memory resources can be internal and/or external to the machine (e.g., the machine can include internal memory resources and have access to external memory resources). The program instructions (e.g., machine-readable instructions (MRI)) can include instructions stored on the MRM to implement a particular function. The set of MRI can be executable by one or more of the processing resources. The memory resources can be coupled to the machine in a wired and/or wireless manner. For example, the memory resources \can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources can be coupled to the memory resources via a communication path. The communication path can be local or remote to the machine. Examples of a local communication path can include an electronic bus internal to a machine, where the memory resources are in communication with the processing resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path can be such that the memory resources are remote from the processing resources, such as in a network connection between the memory resources and the processing resources. That is, the communication path can be a network connection. Examples of such a network connection can include a local area network (LAN), wide area network (WAN), personal area network (PAN), and the Internet, among others.

The MRI stored in the memory resources can be segmented into a number of modules that when executed by the processing resources can perform a number of functions. As used herein a module includes a set of instructions included to perform a particular task or action. The number of modules can be sub-modules of other modules. Furthermore, the number of modules can comprise individual modules separate and distinct from one another.

Some embodiments can include a non-transitory machine-readable medium for utilizing search capabilities for configuring input parameters of a workflow engine according to the present disclosure. The medium can be part of a machine that includes a processing resource (e.g., a processor). The processing resource can be configured to execute instructions stored on the non-transitory machine readable medium. For example, the non-transitory machine readable medium 414 can be any type of volatile or non-volatile memory or storage, such as random access memory (RAM), flash memory, read-only memory (ROM), storage volumes, a hard disk, or a combination thereof. When executed, the instructions can cause the processing resource to create one or more workflows in accordance with the present disclosure.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon which, when executed by a processor, cause the processor to:
   receive, via a user interface associated with execution of a workflow, a portion of an input parameter associated with a particular workflow object from among a plurality of workflow objects of a datacenter, wherein the plurality of workflow objects comprises physical and virtual devices configured within the datacenter, and wherein the input parameter references a physical device or a virtual device of the datacenter;
   communicate the portion of the input parameter to a third-party system before the input parameter is fully entered;
   receive, from the third-party system, search results corresponding to the portion of the input parameter, wherein the search results include identifiers of a subset of the plurality of workflow objects of the datacenter that each have a correlation with the portion of the input parameter, and wherein the correlation refers to a matching of characters of the identifiers to characters of the portion of the input parameter;
   display, via the user interface, the identifiers of the subset of the plurality of workflow objects of the search results as a plurality of items respectively;
   receive a selection, via the user interface, of an item of the plurality of items; and
   designate a workflow object of the subset of the plurality of workflow objects of the search results that corresponds to the selected item as the input parameter and provide the input parameter to the workflow.

2. The medium of claim 1, including instructions to execute the workflow using the workflow object that corresponds to the selected item as the input parameter.

3. The medium of claim 1, including instructions to communicate, as the portion of the input parameter, a portion of a name of the desired workflow object.

4. The medium of claim 1, including instructions to communicate, as the portion of the input parameter, a portion of a type of the desired workflow object.

5. The medium of claim 1, including instructions to communicate, as the portion of the input parameter, a portion of an object identifier of the desired workflow object.

6. The medium of claim 1, including instructions to receive the search results from the third-party system, wherein the search results include results of a distributed full-text search of the datacenter.

7. The medium of claim 1, including instructions to:
display, via the user interface, an item corresponding to a single search result corresponding to the portion of the input parameter, wherein the single search result comprises the particular workflow object of the datacenter, and wherein the particular workflow object of the datacenter has a correlation with the portion of the input parameter;
receive a selection, via the user interface, of the item; and
designate the particular workflow object of the search results as the input parameter of the workflow.

8. The medium of claim 1, wherein a single search result corresponding to the portion of the input parameter is received from the third-party system, wherein the single search result comprises the particular workflow object of the datacenter, wherein the particular workflow object of the datacenter has a correlation with the portion of the input parameter, and wherein the instructions include instructions to designate the particular workflow object of the search results as the input parameter of the workflow responsive to the particular workflow object of the datacenter having the correlation with the portion of the input parameter.

9. The medium of claim 1, wherein the input parameter comprises a name, a type, an object identifier, or a property of the particular workflow object.

10. A system, comprising:
a processing resource; and
a memory resource configured to store instructions which, when executed by the processing resource, cause the processing resource to:
provide a user interface to:
receive, via a field of the user interface, a portion of an input parameter associated with a particular workflow object from among a plurality of workflow objects of a datacenter, wherein the plurality of workflow objects comprises physical and virtual devices configured within the datacenter, and wherein the input parameter references a physical device or a virtual device of the datacenter;
communicate the portion of the input parameter to a third-party system before the input parameter is fully entered;
receive, from the third-party system, search results corresponding to the portion of the input parameter, wherein the search results include identifiers of a subset of the plurality of workflow objects of the datacenter that each have a correlation with the portion of the input parameter, and wherein the correlation refers to a matching of characters of the identifiers to characters of the portion of the input parameter;
display, via a first display element adjacent to the field, the identifiers of the subset of the plurality of workflow objects of the search results as a plurality of items respectively;
determine an occurrence of a first type of interaction, via the user interface, with an item of the plurality of items; and
designate a workflow object of the subset of the plurality of workflow objects of the search results that corresponds to the selected item as the input parameter and provide the input parameter to the workflow.

11. The system of claim 10, wherein the user interface is configured to display, via a second display element adjacent to the first display element, information describing the workflow object corresponding to the item of the plurality of items responsive to a determination of an occurrence of a second type of interaction, via the user interface, with the item of the plurality of items before the occurrence of the first type of interaction.

12. The system of claim 11, wherein the information describing the workflow object corresponding to the item of the plurality of items includes:
a name of the workflow object corresponding to the item of the plurality of items;
a type of the workflow object corresponding to the item of the plurality of items; and
a path associated with the workflow object corresponding to the item of the plurality of items.

13. The system of claim 10, wherein the user interface is configured to:
display, via the first display element adjacent to the field, the plurality of items respectively corresponding to the subset of the plurality of workflow objects of the search results in an order determined based on a respective correlation of each of the subset of the plurality of workflow objects corresponding with the portion of the input parameter.

14. A method for executing a workflow, comprising:
receiving, via a user interface associated with creation of a workflow, a portion of an input parameter associated with a particular workflow object from among a plurality of workflow objects of a datacenter, wherein the plurality of workflow objects comprises physical and virtual devices configured within the datacenter. and wherein the input parameter references a physical device or a virtual device of the datacenter;
communicating the portion of the input parameter from a plugin associated with the user interface to an application programming interface (API) associated with a third-party system before the input parameter is fully entered;
receiving, at the plugin associated with the user interface, search results corresponding to the portion of the input parameter from the API associated with the third-party system, wherein the search results include identifiers of a subset of the plurality of workflow objects of the datacenter that each have a correlation with the portion of the input parameter, and wherein the correlation refers to a matching of characters of the identifiers to characters of the portion of the input parameter;
displaying, via the user interface, the identifiers of the subset of the plurality of workflow objects of the search results as a plurality of items respectively;
receiving a selection, via the user interface, of an item of the plurality of items; and
designating a workflow object of the subset of the plurality of workflow objects of the search results that corresponds to the selected item as the input parameter and provide the input parameter to the workflow.

15. The method of claim 14, wherein the method includes parsing the search results and storing the parsed search results.

16. The method of claim 14, wherein the method includes parsing the search results and storing each of the parsed search results in a respective model class object associated with the plugin.

17. The method of claim 16, wherein each model class object includes properties common to each of the search results.

18. The method of claim 16, wherein the method includes displaying the respective model class objects as the plurality of items.

19. The method of claim 18, wherein the method includes:
   receiving the selection, via the user interface, of a model class object of the model class objects;
   designating the selected model class object as the input parameter of the workflow; and
   executing the workflow using the selected model class object as the input parameter.

20. The method of claim 14, wherein the API comprises a representational state transfer API.

* * * * *